(12) United States Patent
Morita (10) Patent No.: US 10,191,467 B2
(45) Date of Patent: Jan. 29, 2019

(54) ELECTRONIC DEVICE, DETERMINATION METHOD, AND PROGRAM

(71) Applicant: KYOCERA Corporation, Kyoto-shi, Kyoto (JP)

(72) Inventor: Hideki Morita, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 225 days.

(21) Appl. No.: 15/032,628

(22) PCT Filed: Oct. 29, 2014

(86) PCT No.: PCT/JP2014/078814
§ 371 (c)(1),
(2) Date: Apr. 28, 2016

(87) PCT Pub. No.: WO2015/064662
PCT Pub. Date: May 7, 2015

(65) Prior Publication Data
US 2016/0306338 A1    Oct. 20, 2016

(30) Foreign Application Priority Data

Oct. 30, 2013    (JP) .................................. 2013-225528

(51) Int. Cl.
G05B 19/04    (2006.01)
G05B 19/18    (2006.01)
(Continued)

(52) U.S. Cl.
CPC .............. *G05B 19/07* (2013.01); *G05B 11/32* (2013.01); *G05B 19/042* (2013.01); *G07B 5/04* (2013.01);
(Continued)

(58) Field of Classification Search
CPC ...... G05B 19/07; G05B 11/32; G05B 19/042; G05B 2219/37091; G05B 2219/37124;
(Continued)

(56) References Cited

U.S. PATENT DOCUMENTS

2006/0035622 A1* 2/2006 Kampel ............... A63B 29/021
455/404.2
2007/0129909 A1* 6/2007 Kusuda .................. G06F 1/162
702/141

(Continued)

FOREIGN PATENT DOCUMENTS

JP    2003-244314 A    8/2003
JP    2005-12354 A    1/2005
(Continued)

OTHER PUBLICATIONS

International Search Report in International Application No. PCT/JP2014/078814, dated Jan. 27, 2015.

*Primary Examiner* — Ly D Pham
(74) *Attorney, Agent, or Firm* — Hauptman Ham, LLP (57) ABSTRACT

A mobile phone includes an acceleration sensor for detecting acceleration, a magnetic sensor for detecting magnetism, and a controller for determining a type of moving state based on the acceleration detected by the acceleration sensor and the magnetism detected by the magnetic sensor.

14 Claims, 7 Drawing Sheets

(51) Int. Cl.
    *G05B 19/19*     (2006.01)
    *G05B 19/07*     (2006.01)
    *H04M 1/725*     (2006.01)
    *G05B 11/32*     (2006.01)
    *G05B 19/042*     (2006.01)
    *G07B 5/04*     (2006.01)
    *G07B 15/02*     (2011.01)

(52) U.S. Cl.
    CPC ........ G07B 15/02 (2013.01); H04M 1/72569 (2013.01); *G05B 2219/37091* (2013.01); *G05B 2219/37124* (2013.01); *G05B 2219/37324* (2013.01); *G05B 2219/37389* (2013.01); *G05B 2219/37432* (2013.01); *G05B 2219/37433* (2013.01)

(58) Field of Classification Search
    CPC ........... G05B 2219/37324; G05B 2219/37432; G05B 2219/37433; G07B 5/04; G07B 15/02
    USPC .......................................................... 700/306
    See application file for complete search history.

(56) References Cited

U.S. PATENT DOCUMENTS

| | | | | |
|---|---|---|---|---|
| 2011/0212753 | A1* | 9/2011 | Esaki | H04M 1/21 455/567 |
| 2012/0059623 | A1* | 3/2012 | Sambongi | G01C 21/005 702/150 |
| 2012/0212319 | A1* | 8/2012 | Ling | G06F 1/3203 340/3.1 |
| 2012/0220302 | A1* | 8/2012 | Ebara | H04W 64/006 455/437 |
| 2012/0239344 | A1* | 9/2012 | Hasegawa | G01C 21/26 702/150 |
| 2013/0247117 | A1* | 9/2013 | Yamada | G08C 17/02 725/93 |
| 2014/0028596 | A1* | 1/2014 | Seo | G06F 3/0487 345/173 |
| 2014/0155031 | A1* | 6/2014 | Lee | G06F 21/35 455/411 |
| 2014/0172123 | A1* | 6/2014 | Lee | G05B 15/02 700/17 |
| 2014/0188381 | A1* | 7/2014 | Saitoh | G01C 21/005 701/409 |
| 2014/0309963 | A1* | 10/2014 | Tsukamoto | G01C 21/12 702/150 |
| 2015/0019976 | A1* | 1/2015 | Lee | H04L 47/824 715/733 |
| 2015/0281430 | A1* | 10/2015 | Cho | H04M 1/72569 455/418 |
| 2015/0323435 | A1* | 11/2015 | Slupsky | G01M 5/0033 702/43 |
| 2016/0169934 | A1* | 6/2016 | Geisler | G01P 21/00 73/1.37 |
| 2016/0238394 | A1* | 8/2016 | Iimura | G06T 1/0014 |
| 2017/0034642 | A1* | 2/2017 | Takahashi | G10K 15/00 |
| 2017/0091437 | A1* | 3/2017 | Lee | G06F 21/35 |

FOREIGN PATENT DOCUMENTS

| | | |
|---|---|---|
| JP | 2008-160886 A | 7/2008 |
| JP | 2009-284255 A | 12/2009 |

* cited by examiner

ELECTRONIC DEVICE, DETERMINATION METHOD, AND PROGRAM

RELATED APPLICATIONS

The present application is a National Phase entry of International Application No. PCT/JP2014/078814, filed Oct. 29, 2014, which claims priority of Japanese Application No. 2013-225528, filed Oct. 30, 2013.

FIELD

The present disclosure relates to an electronic device with a geomagnetic sensor, a determination method, and a program.

BACKGROUND

There are some electronic devices, among electronic devices with Felica (registered trademark) or the like, that detect a moving state of a user by train by detecting a passage of the user through an automatic ticket gate at a station.

SUMMARY

In a method of detecting the moving state of the user by train using a system of Felica (registered trademark) or the like, it is not possible to detect the moving state of the user getting on a train at a station where no automatic ticket gate is provided.

On the other hand, in a method of using only a value of an acceleration sensor to estimate the moving state of the user by train based on only acceleration detected by the acceleration sensor, the accuracy is not high enough.

An electronic device according to one aspect is an electronic device comprising: an acceleration sensor configured to detect acceleration; a magnetic sensor configured to detect magnetism; and a controller configured to determine a type of moving state based on the acceleration detected by the acceleration sensor and the magnetism detected by the magnetic sensor.

An electronic device according to one aspect is an electronic device comprising: a communication unit configured to perform communication with an external device; a magnetic sensor configured to detect magnetism; and a controller configured to determine a type of moving state based on the detection as to whether the communication unit performs communication with the external device and the magnetism detected by the magnetic sensor.

A method according to another aspect is a determination method for determining a type of moving state in an electronic device configured to include an acceleration sensor, a magnetic sensor, and a controller, the determination method comprising in the controller, a step of detecting acceleration using the acceleration sensor; a step of detecting magnetism using the magnetic sensor; and a step of determining a type of moving state based on the acceleration detected by the acceleration sensor and the magnetism detected by the magnetic sensor.

DETAILED DESCRIPTION

A plurality of embodiments for implementing the present invention will be explained in detail below with reference to the accompanying drawings. A mobile phone 1 will be explained below as an example of the electronic device.

Figure 1:
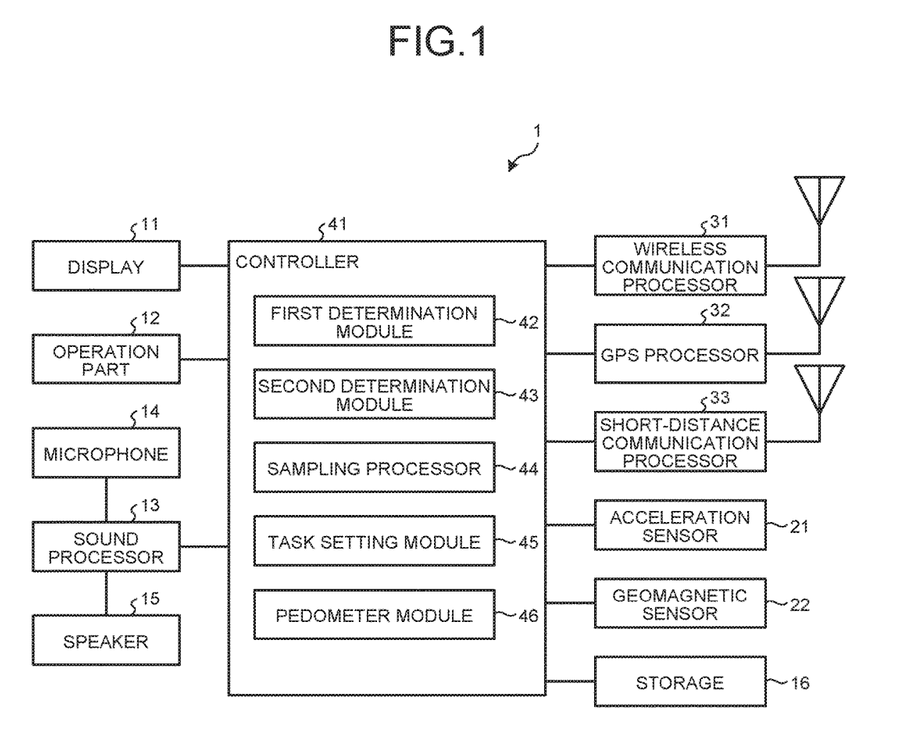
FIG. 1 is one of functional block diagrams illustrating a configuration of a mobile phone according to embodiments.

As illustrated in FIG. 1, the mobile phone 1 may include a display 11, an operation part 12, a sound processor 13, a microphone 14, a speaker 15, a storage 16, an acceleration sensor 21, a geomagnetic sensor 22, a wireless communication processor 31, a GPS processor 32, a short-distance communication processor 33, and a controller 41. The controller 41 includes a first determination module 42, a second determination module 43, a sampling processor 44, a task setting module 45, and a pedometer module 46.

The display 11 may include a display panel such as a liquid crystal display or an organic EL panel, and performs predetermined image processing according to the control of the controller 41. The display 11 may display texts, images, signs, or graphics, etc.

The operation part 12 is configured with a plurality of buttons, and is operated by a user. The operation part 12 may also be configured with a single button. The operation part 12 may be a softkey displayed on the display 11.

The sound processor 13 converts an analog sound signal input to the microphone 14 into a digital signal and outputs the signal to the controller 41, and converts a digital signal input from the controller 41 into an analog sound signal and outputs the signal to the speaker 15. In a third embodiment, the microphone 14 may function as a sensor for detecting a change of environment.

The storage 16 includes, for example, a working memory which is used for operation processing performed by the controller 41. The storage 16 may also function as a detachable external memory. Recorded in the storage 16 are state types or so, as explained later, indicating a type of the moving state of the user, a state of the entrance of the user into the station premises, and a state of the exit of the user out of the station premises.

The acceleration sensor 21 may be a 3-axis type for detecting accelerations in an X-axis direction, a Y-axis direction, and a Z-axis direction, and detects acceleration (a)

based on force (F) applied from outside of the mobile phone 1 and mass (m) of the mobile phone 1 (Acceleration (a)=Force (F)/Mass (m)).

The acceleration sensor 21 measures the force applied to the mobile phone 1 using, for example, a piezoelectric element to calculate acceleration for each axis, changes the accelerations to numerical data, and buffers acceleration data. The second determination module 43 periodically reads the buffered acceleration data. The acceleration sensor 21 may be configured with an MEMS (Micro Electro Mechanical Systems) type acceleration sensor using not only the piezoelectric element but also a piezoresistive type, a capacitive type, and a heat-sensitive type; a servo-type acceleration sensor for moving a moving coil and returning it to its original position by a feedback current; or a strain gauge type acceleration sensor which detects a strain occurred due to acceleration using a strain gauge, and the like.

The geomagnetic sensor 22 may be a three-axis sensor for detecting a magnetic field intensity component or a magnetic flux density component of geomagnetism on coordinates of a coordinate system with the three axes of the X axis, the Y axis, and the Z axis set on a circuit board. The mobile phone 1 uses a detection result of the geomagnetic sensor 22 to calculate a change amount when the component is changed with respect to a direction of the geomagnetism being a reference or to calculate a north direction for specifying a direction of the user facing thereto. Various methods are used for detection of the geomagnetism, such as a method for detecting a resistance of a magnetic resistor, a method for using excitation of a coil, and a method for using the Hall effect. In the present embodiment, the first determination module 42 detects the change in magnetism using the 3-axis geomagnetic sensor 22, and thereby detects largely changes in the magnetic field caused by a flow of a large current on a departure and an acceleration as well as a deceleration and a stop of a train that collects power from a pantograph or a contact shoe etc. mounted thereon, and estimates the departure and acceleration of the train as well as the deceleration and stop thereof.

The wireless communication processor 31 has a DSP (Digital Signal Processor) or the like, performs wireless communication with a base station to make a phone call communication with another phone, and connects to a connection network such as the Internet via a gateway to perform data communication.

The GPS processor 32 detects a current position in real time by using GPS (Global Positioning System) for positioning the current position on the earth. For example, the GPS processor 32 acquires a propagation time of radio waves and orbit information of satellites from the radio waves received from a plurality of GPS satellites, and checks distances from the GPS satellites and positions of the GPS satellites based on the information to detect a current position of the mobile phone 1.

When GPS communication is impossible, the GPS processor 32 uses AGPS (Assisted Global Positioning System) to detect the current position of the mobile phone 1.

AGPS communication mentioned here is positioning using GPS performed while being supported by a GPS positioning assist server (not illustrated) connected to the network. The GPS positioning assist server always collects information of GPS satellites and transmits capture information of GPS satellite, position calculation information for calculating the current position of the mobile phone 1, and the like to the mobile phone 1 if receiving a request of information for positioning from the mobile phone 1 using an identifier, as a parameter, of the base station that establishes wireless communication with the mobile phone 1. Therefore, the mobile phone 1 can detect the current position of its own even at a location such as a subway where GPS communication is impossible.

The short-distance communication processor 33 directly communicates with an external device having a reader/writer function, which will be explained later, through short-distance communication such as infrared communication, non-contact IC communication, Bluetooth (registered trademark), wireless USB, and NFC (Near Field Communication). In the present embodiment, in the mobile phone 1 with functions of Suica (registered trademark) and Felica (registered trademark), the short-distance communication processor 33 performs communication with an automatic ticket gate at a station ticket gate, and thereby performs data communication for storing the name of a station where the user enters through the ticket gate and its time as well as the name of a station where the user exits through the ticket gate and its time, and for performing fare processing, and the like. In a bus route where Suica (registered trademark) is available, the data communication for fare processing is performed between the mobile phone 1 with the function of Suica (registered trademark) and the external device provided in the bus.

The controller 41 controls the entire mobile phone 1, and is configured by using a central processing unit (CPU) or the like. The details of the controller 41 will be explained later.

The first determination module 42 determines whether a change within a predetermined condition occurs in magnitude of magnetism detected by the geomagnetic sensor 22. The details thereof will be explained later.

The second determination module 43 determines whether the moving state is a moving state by vehicle based on an acceleration signal detected by the acceleration sensor 21. The second determination module 43 determines whether the moving state is a moving state by vehicle or a stop state, a walking state, a running state, and a moving state by bicycle based on the acceleration signal detected by the acceleration sensor 21. The "moving state by vehicle" is a state in which the user is moving by vehicle. The "Stop state" is a state in which the user is not moving. The "Walking state" is a state in which the user is moving on foot. The "Running state" is a state in which the user is moving at a run. The "moving state by bicycle" is a state in which the user is moving by bicycle. In the present embodiment, the bicycle is not included in "vehicle", but the bicycle may be included in "vehicle". In other words, the "moving state" indicates the moving means of the user when the user moves.

As a detection algorithm to detect one of the moving states using the acceleration sensor 21, an algorithm is known in which amplitudes of acceleration and vibration periods different in the following cases are used, for example, when a person is walking, when a person is running, when a person is riding on a bicycle, and when a person is riding on a vehicle such as a car and a train. In this case, if the moving state is determined based on the acceleration in a short time period, an erroneous determination may be made due to a temporary vibration of the device. Thus the mobile phone 1 acquires acceleration in a predetermined period of time and determines, if continuous amplitude and vibration period in the predetermined period of time satisfy a predetermined condition, that the moving state is appropriate to the type of the moving state corresponding to the condition. The above-described detection algorithm is not limited to the embodiments.

The sampling processor 44 receives an instruction of the user to perform sampling processing on data for the magnitude of magnetism to analyze the change in the magnitude of magnetism during a sampling period, and extracts its characteristic portion.

The task setting module 45 sets a predetermined task in association with a predetermined moving state based on the instruction of the user. The task setting module 45 can also set a predetermined task in association with a change of the moving state.

The pedometer module 46 calculates the number of steps of the user based on the result of determination by the acceleration sensor 21. Specifically, the pedometer module 46 presets values for walking, running, and going up/down of stairs, etc., of the user from the detection result of the acceleration sensor, and calculates the number of steps based on the set values. The method of calculating the number of steps is not limited to the method. The method may be implemented by calculating the number of steps with reference to a table in which the detection results of the acceleration sensor 21 are associated with the walking, running, and going up/down of stairs, etc., of the user, or by determining the walking, running, and going up/down stairs, etc., of the user from waveforms of the detection results by the acceleration sensor 21. With the detection of predetermined acceleration by the acceleration sensor 21 within a predetermined time as a trigger, the pedometer module 46 integrates steps detected before that time based on the detection results of the acceleration sensor 21.

Figure 2:
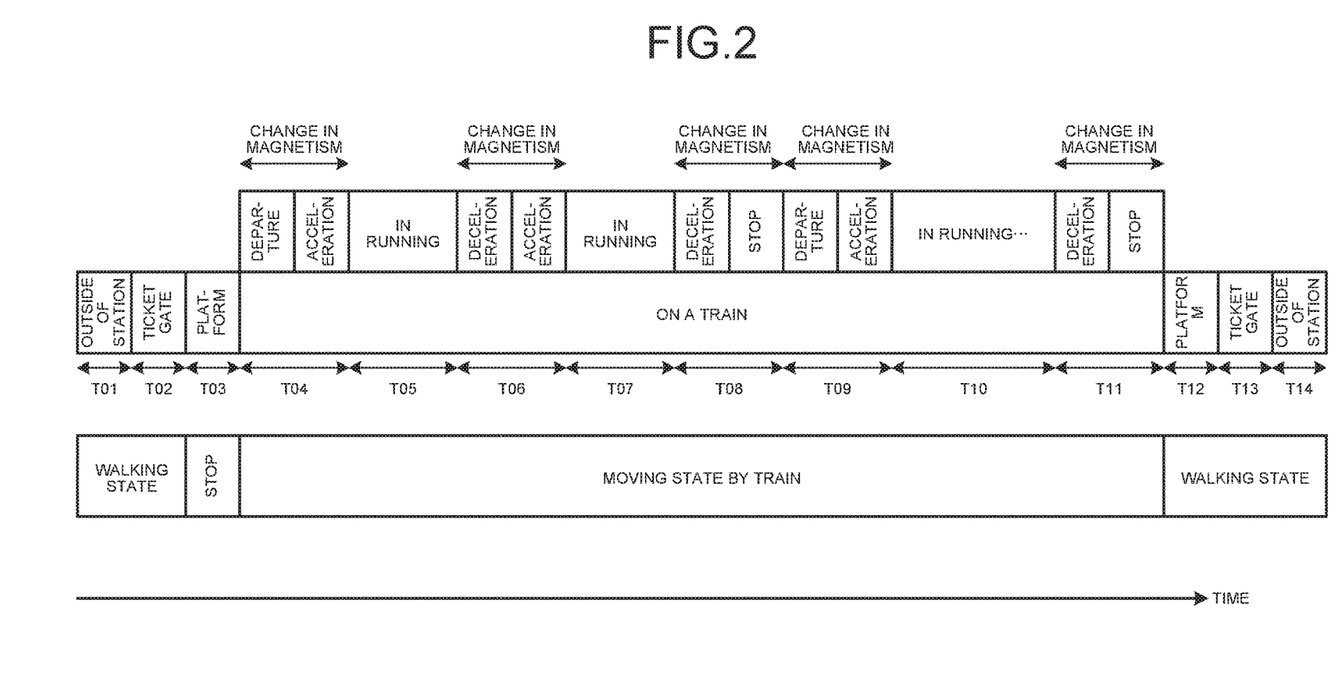
FIG. 2 is one of diagrams illustrating a time chart from the time when the user carrying the mobile phone according to the time the embodiments enters a station through a ticket gate, moves by train, and gets off at a target station to when the user goes out of the station through a ticket gate.

FIG. 2 is a time chart from the time when the user enters the premises of a station through the ticket gate from outside of the station, waits for a train at a platform, and gets on a target train which stops, to the time when the train stops at a target station, the user gets off the train to go out of the station through the ticket gate on foot.

The operation detail of the mobile phone 1 according to the embodiments will be explained below with reference to the time chart of FIG. 2.

First Embodiment

In one of embodiments, the mobile phone 1 may include the acceleration sensor 21, the geomagnetic sensor 22, and the controller 41. The controller 41 performs determination as to whether the moving state is a moving state by vehicle in a given period of time or not, triggered by the magnetic data detected by the geomagnetic sensor 22. When the change in the magnitude of the magnetism detected by the geomagnetic sensor 22 is determined to be the change within the predetermined condition, and a pattern of the acceleration signal detected for a given period of time by the acceleration sensor 21 is determined to be a predetermined pattern by the controller 41, the type of the moving state is determined to be the moving state by train. The configuration of a first embodiment will be explained below. The "moving state by train" is a state in which the user is moving by train.

In one of embodiments, the mobile phone 1 may not need to have the GPS processor 32 and the short-distance communication processor 33.

Figure 3:
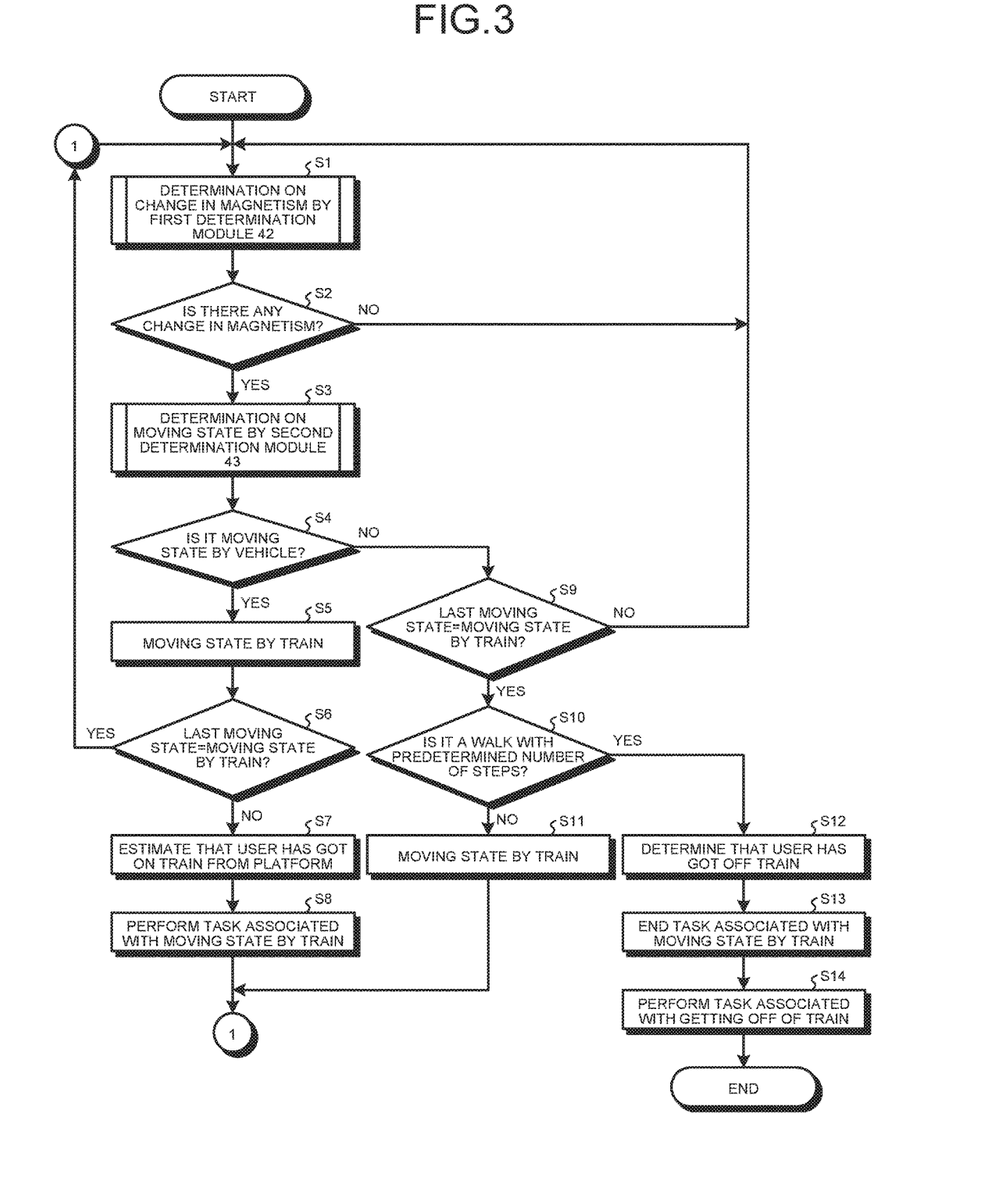
FIG. 3 is one of flowcharts for explaining a flow of operations for detecting the moving state by train by a mobile phone according to a first embodiment.

FIG. 3 is one of flowcharts for detecting the moving state by train by the mobile phone 1 according to the first embodiment.

The task setting module 45 previously sets execution of a predetermined task associated with the moving state by train based on instruction inputs by the user. The task associated with the moving state by train includes those, such as a task for setting the mobile phone 1 to Silent mode (hereinafter, called "task 01"), a task for notifying, when receiving an incoming call in an idle state, the caller that the user is on a train (hereinafter, called "task 02"), a task for setting the mobile phone 1 to Manner talk (hereinafter, called "task 03"), and a task for delivering the information that the user has got on the train to a predetermined person by mail or the like (hereinafter, called "task 04"). In the task 04, for example, the user is a child, and the predetermined person is the child's parent. A plurality of these tasks can be set at the same time.

The task setting module 45 may set determination as to whether the task is ended at the time of getting off the train along with the setting of the execution of the task associated with the moving state by train. For example, the task setting module 45 may set so that the task 01, the task 02, and the task 03 are ended at the time of getting off the train.

The above-described tasks are just an example, and the task that can be set in association with the moving state by train is not limited thereto.

Furthermore, the task setting module 45 may be configured so as to set the execution of a predetermined task in association with the time at which the user gets off the train based on the instruction inputs by the user. The time at which the user gets off the train mentioned herein means a time point at which the moving state is changed from the moving state by train to the walking state. The task associated with the time at which the user gets off the train includes, for example, a task for delivering the information that the user has got off the train to a predetermined person by mail or the like (hereinafter, called "task 11"). In the task 11, for example, the user is a child, and the predetermined person is the child's parent.

Referring to FIG. 2, the user walks to the outside of the ticket gate of the station in a time zone T01, passes through the ticket gate of the station in a time zone T02, and waits for a train at the platform of the station in a time zone T03. During this time, the second determination module 43 determines the walking state or the stop state.

At Step S1, the first determination module 42 determines whether any change within the predetermined condition has occurred in the magnitude of the magnetism detected by the geomagnetic sensor 22. The magnitude of the magnetism is represented by, for example, three-axis magnetic vector values or a one-axis magnetic data value. The first determination module 42 is preferably operated in advance. When the time at which the user gets on the train is previously known based on the daily use of a commuter train, the first determination module 42 may be configured so as to be automatically activated before the user gets on the train.

The change within the predetermined condition in the magnitude of magnetism mentioned here means a state in which a first change in the magnetic flux density is occurred within n seconds and, thereafter, a second change in the magnetic flux density is maintained for m seconds.

It is preferable herein that n is a value equal to or less than 10 and m is a value equal to or less than 30.

The first change in the magnetic flux density means a change such that the detected magnetic flux density exceeds J1 µT (microtesla) which is a first threshold.

The second change in the magnetic flux density means a value within a range obtained by adding and subtracting a second threshold (J2 µT) to and from the first threshold J1.

It is preferable herein that J1 is a value within a range of 50 to 1000 and J2 is a value within a range of 50 to 1000.

Although a normal magnitude of magnetism i.e. geomagnetism is slightly different depending on locations, it is known that the magnitude of magnetism in Tokyo is substantially 46 µT.

Figure 4:
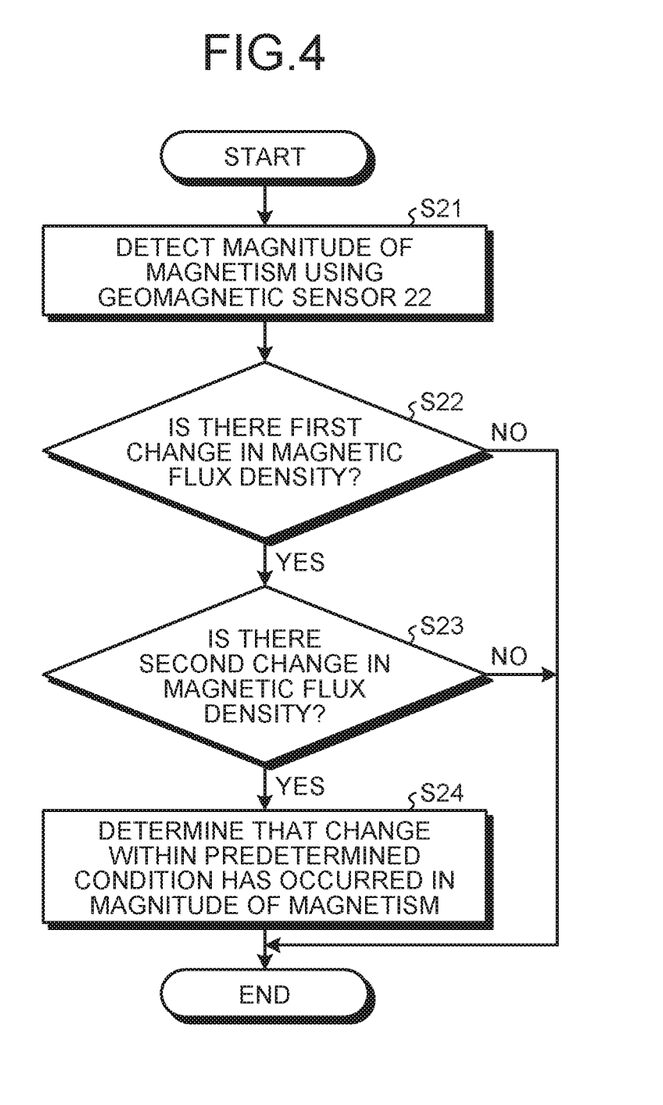
FIG. 4 is one of flowcharts for explaining a flow of processing for determining a change in magnitude of magnetism by a first determination module of the mobile phone according to the first embodiment.

FIG. 4 is one of flowcharts for detecting a change within a predetermined condition in the magnitude of magnetism detected by the geomagnetic sensor 22, by the first determination module 42 of the mobile phone 1.

At Step S21, the geomagnetic sensor 22 detects the magnitude of magnetism. At Step S22, the first determination module 42 determines whether the first change of the magnetic flux density in the magnitude of magnetism within n seconds has been occurred. When the first change of the magnetic flux density has been occurred (Yes), the controller 41 proceeds to Step S23. Meanwhile, when the first change of the magnetic flux density has not been occurred (No), the controller 41 ends the processing.

At Step S23, the first determination module 42 determines whether the second change of the magnetic flux density is maintained for m seconds after that. When the second change of the magnetic flux density is maintained for m seconds (Yes), the controller 41 proceeds to Step S24. Meanwhile, when the second change of the magnetic flux density is not maintained for m seconds (No), the controller 41 ends the processing.

At Step S24, the first determination module 42 determines that a change within the predetermined condition has occurred in the magnitude of the magnetism.

Figure 5:
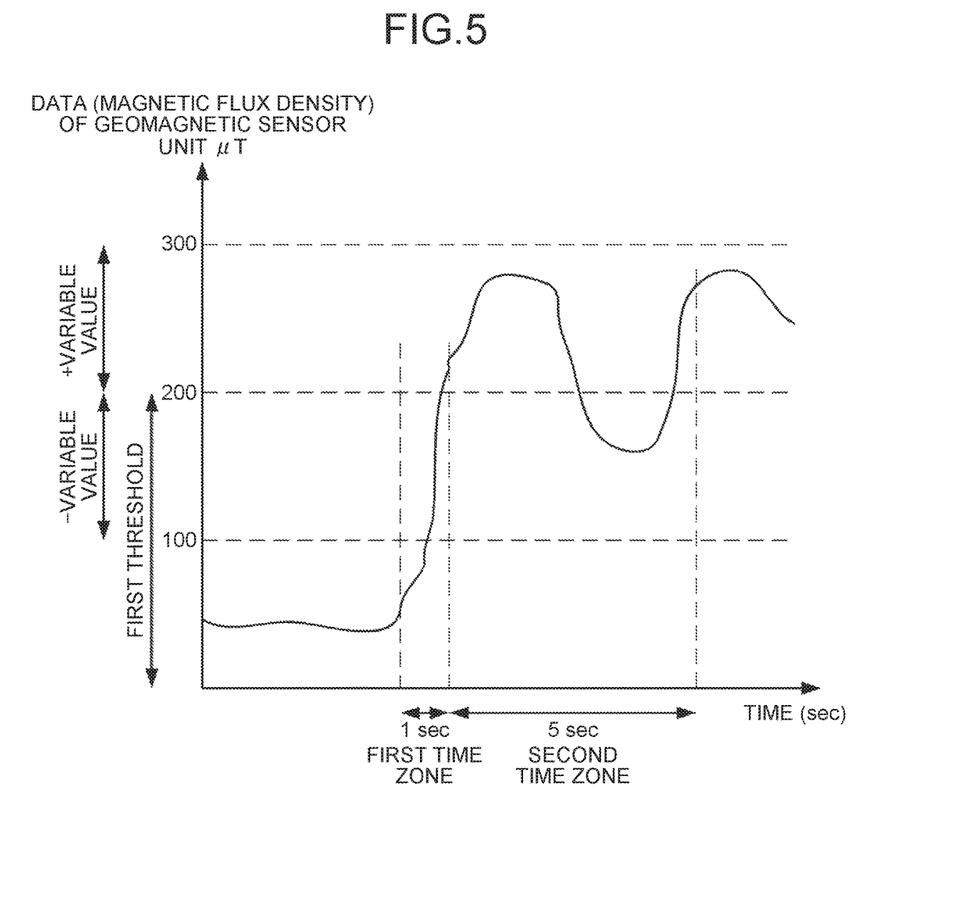
FIG. 5 is one of diagrams illustrating an example of the change in magnitude of magnetism detected by a magnetic sensor according to the embodiments.

For example, 1 second as n second, 200 µT as the first threshold, a time zone of 5 seconds as m second, and 100 µT as the second threshold may be adopted. In this case, as illustrated in FIG. 5, the first determination module 42 determines whether the magnitude of the magnetism has changed from the normal value to 200 µT or more for one second. When it is determined that the change has occurred, the first determination module 42 further determines whether the change within 100 to 300 µT in the magnitude of the magnetism is maintained for 5 seconds.

Referring to FIG. 2, the first determination module 42 determines that the change within the predetermined condition has occurred in the magnitude of the magnetism in the time zone T04 from the departure of the train that the user gets on to the acceleration.

When n seconds, m seconds, the first threshold, and the second threshold are to be set, it can be configured so that the user can set the values based on the reference data. In this case, the mobile phone 1 is configured so as to have the sampling processor 44. The user operates keys of the operation part 12 before getting on the train to activate the sampling processor 44, and starts sampling processing of data for the magnitude of the magnetism. When the sampling period is finished, the sampling processor 44 analyzes the change in the magnitude of the magnetism during the sampling period, extracts a characteristic portion of the change, and is able to calculate the n seconds, the m seconds, the first threshold, and the second threshold.

The sampling processing is preferably repeated a plurality of times. The sampling processing is more preferably performed on the train the user often uses, for example, the commuter train of the user. By providing the sampling processor 44, it is possible to additionally set n seconds, m seconds, the first threshold, and the second threshold which are optimal to a user's train using environment, other than preset standard values.

Referring back to Step S2 in the flowchart of FIG. 3, when the first determination module 42 determines that the change in the magnitude of the magnetize is a change within the predetermined condition (Yes), the controller 41 proceeds to Step S3. Meanwhile, when the change in the magnitude of the magnetize is not a change within the predetermined condition (No), the controller 41 returns to Step S1.

At Step S3, in the controller 41, the second determination module 43 determines whether the moving state is the moving state by vehicle or not.

If the moving state is determined based on the acceleration in a short time, an erroneous determination may be made due to a temporary vibration of the mobile phone 1. Thus the second determination module 43 determines whether the moving state is the moving state by vehicle or not until a given time passes. When the given time passes, and, for example, if a continuous amplitude and vibration period in a predetermined period satisfy the predetermined condition, the second determination module 43 determines that the moving state corresponds to the type of the moving state corresponding to the predetermined condition. The second determination module 43 determines whether the moving state is the moving state by vehicle or any moving state other than the moving state by vehicle, such as the stop state or the walking state.

When Getting on Train

When the result of determination of the second determination module 43 is the moving state by vehicle at Step S4 (Yes), the controller 41 proceeds to Step S5. Meanwhile, when the result of determination of the second determination module 43 is not the moving state by vehicle (No), the controller 41 proceeds to Step S9.

At Step S5, the controller 41 determines that the moving state is the moving state by train which shows that the user is moving by train.

Subsequently, at Step S6, the controller 41 determines whether the type of the last moving state immediately before the determination is the moving state by train or not. When the type of the last moving state is not the moving state by train (No), the controller 41 proceeds to Step S7. Meanwhile, when the type of the last moving state is the moving state by train (Yes), the controller 41 returns to Step S1.

At Step S7, the controller 41 estimates that the user has got on the train from the platform.

At Step S8, the controller 41 performs the task associated with the moving state by train by the task setting module 45. For example, when the task 01, the task 02, the task 03, and the task 04 are set, the controller 41 sets the mobile phone 1 to Silent mode, sets the mobile phone so as to automatically notify, when receiving an incoming call, the caller that the user is on the train, sets the mobile phone 1 to Manner talk, and delivers the information that the user has got on the train to a predetermined person by mail or the like.

Thereafter, the controller 41 returns to Step S1.

On a Train

At Step S6, when the type of the last moving state is the moving state by train (Yes), as illustrated in FIG. 2, the controller 41 estimates that the train has been accelerated from the deceleration in a time zone T06, that the train has been decelerated to stop at a way station in a time zone T08, or that the train has departed from the way station and been accelerated in a time zone T09, and returns to Step S1.

The first determination module 42 continuously maintains the operation for determining whether the change within the predetermined condition has occurred in the magnitude of the magnetism detected by the geomagnetic sensor 22.

By doing this, the controller 41 automatically performs an desired operation of the user when getting on a train. For example, when receiving an incoming call while the user is on the train, bothering others in the train with the call can be avoided since the mobile phone 1 is set so as to be automatically changed to Silent mode even when the user forgets to set the mobile phone 1 to Silent mode.

As explained above, the mobile phone 1 may automatically determine that the user gets on a train by the acceleration sensor 21 and the geomagnetic sensor 22, and can automatically implement any desired operation of the user on the train, thus improve the user's convenience without any extra cost.

When Getting Off Train

Referring to FIG. 2, the user gets off at a station where the train is decelerated to stop in a time zone T11. The user gets off the train at the station and walks along the platform in a time zone T12, passes through the ticket gate in a time zone T13, and walks on after passing through the ticket gate in a time zone T14.

In this case, the second determination module 43 can determine that the moving state is the walking state. Then, when the pedometer module 46 calculates a predetermined number of steps, for example, 10 steps or more, the controller 41 can determine that the user has got off the train.

In other words, when the moving state is not the moving state by vehicle at Step S4 (No), the controller 41 proceeds to Step S9.

At Step S9, the controller 41 determines whether the type of the last moving state is the moving state by train on not. When the type of the last moving state is the moving state by train (Yes), the controller 41 proceeds to Step S10. Meanwhile, when the type of the last moving state is not the moving state by train (No), the controller 41 returns to Step S1.

At Step S10, the controller 41 determines whether the user has walked the predetermined number of steps or more. When it is calculated that the user's steps are the predetermined number of steps or more (Yes), the controller 41 proceeds to Step S12. Meanwhile, when it is calculated that the user's steps are not the predetermined number of steps or more (No), the controller 41 proceeds to Step S11, where it is determined that the moving state is the moving state by train, and returns to Step S1.

At Step S12, the controller 41 determines that the user has got off the train.

At Step S13, the controller 41 ends the task which is associated with the moving state by train and is set so as to be ended when the user gets off the train. When the task setting module 45 sets so as to end the task 01, the task 02, and the task 03 when the user gets off the train, the controller 41 automatically releases the setting of the Silent mode of the mobile phone 1 when the user has got off the train, ends the task 02 of notifying, when receiving an incoming call, the caller that the user is on the train, and releases the setting of Manner talk of the mobile phone 1.

At Step S14, the controller 41 performs the task associated with getting off the train. For example, when the task 11 is set in the same manner as above, the controller 41 delivers the information that the user has got off the train to the predetermined person by mail or the like.

By doing this, the user may automatically end the setting which becomes unnecessary after getting off the train.

It is preferable that the controller 41 maintains the operations of the second determination module 43 and the first determination module 42 so that the mobile phone 1 can continuously determine the next change of the moving state after the determination on getting off the train.

By doing this, the controller 41 may detect, for example, getting on another train or getting on a bus after getting off the train.

As explained above, the mobile phone 1 automatically may determine the getting off of the train by the acceleration sensor 21 and the geomagnetic sensor 22, and can thereby automatically implement any desired operation of the user, thus may improve the user's convenience. The mobile phone 1 may also provide the time zone and the cumulative time of the moving state by train from getting on the train to getting off the train in a one day's lifelog to the user.

Stop, Etc. at Way Station

Referring to FIG. 2, the first determination module 42 determines that the change within the predetermined condition has occurred in the magnitude of the magnetize detected by the geomagnetic sensor 22 in the time zone T06 when the train is accelerated from the deceleration while running, in the time zone T08 when the train is decelerated to stop at a way station, and in the time zone T09 when the train departs from the way station and is accelerated, even if it is in the time zone when the user is on the train.

By referring to the flowchart of FIG. 3, at Step S2, the first determination module 42 determines that the change in the magnitude of the magnetism corresponds to the change within the predetermined condition in the time zone T06 in which the train is accelerated from the deceleration while running (Yes), and the controller 41 proceeds to Step S3.

At Step S3, in the controller 41, the second determination module 43 determines whether the moving state is the moving state by vehicle or not. In this case, since it is determined that the moving state is the moving state by vehicle at Step S4 (Yes), the controller 41 determines that the moving state is the moving state by train in which the user is moving by train at Step S5. Since it is determined that the last moving state is the moving state by train at Step S6 (Yes), the controller 41 estimates that the moving state by train is maintained.

The controller 41 returns to Step S1.

The first determination module 42 continuously maintains the operation for determining whether the change within the predetermined condition has occurred in the magnitude of the magnetism detected by the geomagnetic sensor 22.

Similarly, when it is determined that the moving state is not the moving state by vehicle at Step S4 in the stop time T08 in which the train stops at the way station (No), the controller 41 proceeds to Step S9.

Since it is determined that the last moving state is the moving state by train at Step S9 (Yes) and the calculated number of steps of the user is not the predetermined number of steps or more at Step S10 (No), the controller 41 can correct the moving state to the moving state by train at Step S11.

After the time for the stop at the way station has passed, in the time zone T09 in which the train departs and is accelerated, then at Step S2, the first determination module 42 determines that the change in the magnitude of the magnetism corresponds to the change within the predetermined condition (Yes), and the controller 41 determines that the moving state is the moving state by train at Step S3 to Step S5. Since it is determined that the last moving state is the moving state by train at Step S6, the controller 41 estimates that the moving state by train is maintained.

Even if the train stops while running, the same control as that of the stop at the way station is performed.

Embodiments in which the order of the detection by geometric sensor 22 and by acceleration sensor 21a are reversed The operation details of the mobile phone 1 according to the first embodiment have been explained so far with reference to the time chart of FIG. 2. It is preferable that the second determination module 43 is activated in advance by the operation of the user and starts detecting the moving state according to the operation of starting detection of the moving state.

At that time, it is obvious that the first determination module 42 determines whether the change within the predetermined condition has occurred in the magnitude of the magnetism or not, with the detection of the moving state by vehicle by the second determination module 43 as trigger, and that the controller 41 can determine whether the moving state by vehicle is the moving state by train or not based on the determination result.

When the vehicle is not a train, the change within the predetermined condition does not occur in the magnitude of the magnetism while the moving state by vehicle is maintained. Therefore, the controller 41 can determine that the moving state by vehicle is the state in which the user is moving by any vehicle other than the train.

As explained above, the mobile phone 1 may detect more accurately whether the vehicle in the moving state by vehicle is a train or not only by using the acceleration sensor 21 and the geomagnetic sensor 22. In this way, the mobile phone 1 may be implemented only by the sensors, thus improves the determination accuracy without any extra cost. The mobile phone 1 can also record time zones of the moving state by train from getting on the train to getting off the train as a one day's lifelog of the user as history information. The mobile phone 1 may determine the moving state for using any vehicle other than the train. Therefore, for example, when the user gets a train and a bus to work, the mobile phone 1 may distinctively record the moving state by train and the moving state by bus as the one day's lifelog of the user.

Second Embodiment

In one of embodiments, the mobile phone 1 may include the acceleration sensor 21, the geomagnetic sensor 22, the short-distance communication processor 33, and the controller 41. The short-distance communication processor 33 may perform data communication with an automatic ticket gate at a station ticket gate in order to store the name of the station and the time of the passage of the user through the ticket gate to enter the station premises, and the controller 41 detects the state of the entrance of the user into the station premises based on completion of the data communication. Therefore, the controller 41 may predict that the user will get on the train to move based on the state of the entrance of the user into the station premises, which is detected by the short-distance communication processor 33.

For the second embodiment, some points different from the first embodiment will be mainly explained below, and detailed explanation of configuration similar to that of the first embodiment will be omitted.

The short-distance communication processor 33 performs data communication with the automatic ticket gate at the station ticket gate in order to store the name of the station and the time of the passage of the user through the ticket gate to enter the station premises, and the controller 41 determines the state of the entrance of the user into the station premises based on the completion of the data communication.

When the user exits the station premises, the short-distance communication processor 33 performs data communication with an automatic ticket gate at a station ticket gate in order to store the name of the station and the time of the passage of the user through the ticket gate to exit the station and to perform fare processing, or the like, and the controller 41 determines the state of the exit of the user out of the station premises based on the completion of the data communication.

Move to Station Premises

Referring to FIG. 2, in the time zone T02, the user passes through the station ticket gate on foot and enters the station premises.

Figure 6:
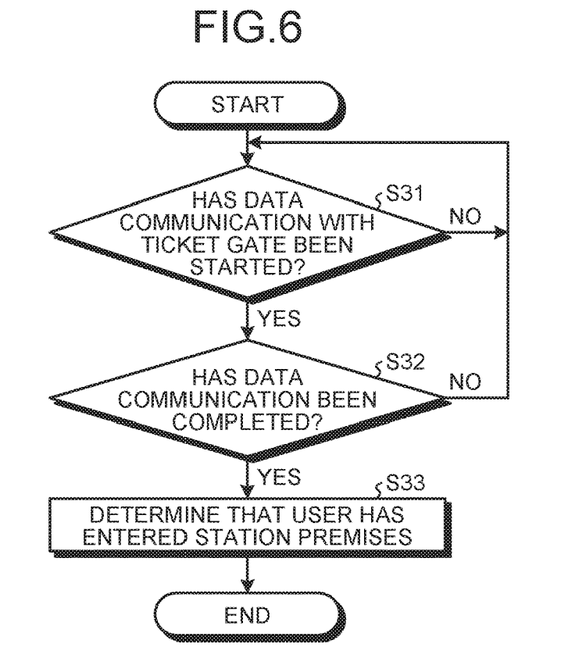
FIG. 6 is one of flowcharts for explaining a flow of operations for detecting an entrance of the user into the station premises by a mobile phone according to a second embodiment.

FIG. 6 is one of flowcharts for detecting a state of the entrance of the user into the station premises by the mobile phone 1.

At Step S31, the controller 41 determines whether the short-distance communication processor 33 performs data communication with, for example, an external device of the automatic ticket gate at the station ticket gate. When the data communication is performed between the short-distance communication processor 33 and the external device (Yes), the controller 41 proceeds to Step S32.

At Step S32, the controller 41 determines whether the short-distance communication processor 33 has completed the data communication, with the external device of the automatic ticket gate at the station ticket gate, in order to store the name of the station and the time of the passage of the user through the ticket gate to enter the station premises, or the like. When the data communication has been completed (Yes), the controller 41 proceeds to Step S33.

At Step S33, the controller 41 determines that the user has entered the station premises.

The processing for determining whether the user is in the moving state by train or not after entering the station premises may be the same as the processing according to the first embodiment, and therefore explanation thereof is omitted.

Move to Outside of Station Premises

Referring to FIG. 2, in the time zone T13, the user passes through the station ticket gate on foot to exit the station premises.

Figure 7:
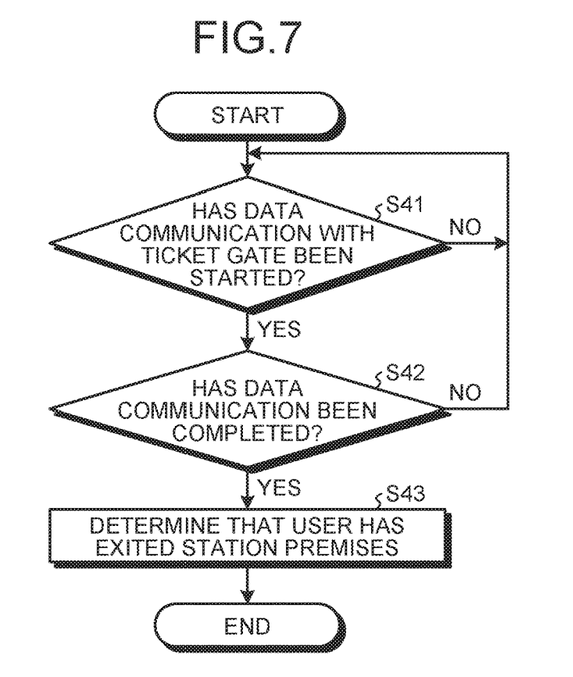
FIG. 7 is one of flowcharts for explaining a flow of operations for detecting an exit of the user out of the station premises by the mobile phone according to the second embodiment.

FIG. 7 is one of flowcharts for detecting a state of the exit of the user out of the station premises by the mobile phone 1 according to the second embodiment.

At Step S41, the controller 41 determines whether the short-distance communication processor 33 has performed the data communication with an external device of the automatic ticket gate at the station ticket gate. When the data communication has been performed between the short-distance communication processor 33 and the external device (Yes), the controller 41 proceeds to Step S42.

At Step S42, the controller 41 determines whether the short-distance communication processor 33 has completed the data communication, with the external device of the automatic ticket gate at the station ticket gate, in order to store the name of the station and the time of the passage of the user through the ticket gate to exit the station premises and to perform fare processing, or the like. When the data communication has been completed (Yes), the controller 41 proceeds to Step S43.

At Step S43, the controller 41 determines that the user has exited the station premises.

In the first embodiment, when the detection result of the second determination module 43 does not indicate the moving state by vehicle for a given time period and also when the moving state of the user indicates the walking state as well as a predetermined number of steps are observed, the controller 41 may determine that the user has got off the train.

In the second embodiment, when it is detected that the user has gone out of the station premises, in addition to the determination, the controller 41 may reconfirm that the user has got off the train.

The mobile phone 1 may not only record time zones of the moving state by train from getting on the train to getting off the train and the cumulative time as the one day's lifelog of the user as history information, but also record a time period of the moving state by train from a getting-on station to a getting-off station.

Third Embodiment

In one of embodiments, the mobile phone 1 may include the acceleration sensor 21, the geomagnetic sensor 22, the sound processor 13, the microphone 14, and the controller 41. Although the controller 41 of the mobile phone 1 according to the second embodiment determines the entrance of the user into the station premises by determining the completion of the data communication performed by the short-distance communication processor 33, the controller 41 of the mobile phone 1 according to the third embodiment determines the entrance of the user into the station premises by using the sound processor 13.

The sound processor 13 converts an analog sound signal input to the microphone 14 into a digital signal. Therefore, the controller 41 may determine the entrance of the user into the station premises, based on the digital signal into which the announcements in the station premises and in the train and any sound of the train in the platform of the station premises acquired through the microphone 14 are converted by the sound processor 13. Moreover, the controller 41 may also determine the station and the route by the announcements in the station premises and in the train.

In this case, when the first determination module 42 determines that any change within the predetermined condition has occurred in the magnitude of the magnetism detected by the geomagnetic sensor 22, the controller 41 may operate the sound processor 13 and the microphone 14 to be able to determine the station and the route using the announcements in the station premises and in the train acquired through the microphone 14. By doing this, the controller 41 may determine the getting-on station, the way station, and the getting-off station, in which the change within the predetermined condition occurs in the magnitude of the magnetism, thus more accurately determining the station and the route.

The task setting module 45 is configured so as to set a task that is associated with passing of a predetermined way station in the moving state by train, and this allows the mobile phone 1 to deliver, for example, the information that the user is passing through the way station to a predetermined person by mail or the like. It may also be configured to activate the sound processor 13 and the microphone 14 through user's operation before getting on the train and to start detecting ambient sound.

For the determination on the getting off, the controller 41 may determine that the user has got off the train when the determination result of the second determination module 43 does not indicate the moving state by vehicle for a given time and if the pedometer module 46 calculates a predetermined number of steps.

Vehicles Other than Trains

In one of embodiments the mobile phone 1 may determine any vehicle other than the train.

The microphone 14 may acquire announcement when the user gets on a bus and announcement for a stop in the bus, in addition to that of the train, and the controller 41 may determine whether the user is in the moving state by bus based on the digital signal into which the acquired announcements are converted by the sound processor 13.

The controller 41 may determine that the vehicle seems to be a bus based on the digital signal into which the announcement when the user gets on the bus and the announcement for stops in the bus acquired through the microphone 14 are converted by the sound processor 13. The second determination module 43 may determine whether the moving state is the moving state by vehicle, and when it is determined that the moving state is the moving state by vehicle, the controller 41 may determine that this vehicle is a bus and the moving state is the moving state by bus.

In this case, the task setting module 45 may set execution of the predetermined task in association with the moving state by bus based on an instruction input by the user. By doing this, the mobile phone 1 may automatically execute and end the predetermined task responding to the moving state by bus.

For the determination on the getting off, the controller 41 may determine that the user has got off the bus when the determination result of the second determination module 43 does not indicate the moving state by vehicle for a given time and if the pedometer module 46 calculates a predetermined number of steps.

Moreover, the mobile phone 1 uses the microphone 14 to acquire announcements or the like in a departure/arrival place of a ship or in an airport other than the train and bus, and can determine whether the user is in the moving state by ship or in the moving state by airplane based on the digital signal into which the acquired announcements are converted by the sound processor 13.

In this case, the task setting module 45 may set the execution of the predetermined task in association with the moving state by ship or with the moving state by airplane based on the instruction input by the user. By doing this, the mobile phone 1 may automatically execute and end the predetermined task responding to the moving state by ship or to the moving state by airplane.

For the determination on the getting off, the controller 41 may determine that the user has got off the ship or the airplane when the determination result of the second determination module 43 does not indicate the moving state by vehicle for a given time and if the pedometer module 46 calculates a predetermined number of steps.

The microphone 14 acquires engine sound of a vehicle, and the controller 41 can determine whether the moving state is, for example, a moving state by car or a moving state by motorcycle based on the digital signal into which the acquired engine sound is converted by the sound processor 13.

Fourth Embodiment

In one of embodiments, the mobile phone 1 may include the acceleration sensor 21, the geomagnetic sensor 22, the GPS processor 32, and the controller 41. The GPS processor 32 periodically may detect a current position of the mobile phone 1 using data of GPS measuring a current position on the earth and performs matching with map information, and the controller 41 thereby determines the current position. When GPS communication is not possible, the GPS processor 32 uses AGPS communication to detect the current position of the mobile phone 1.

When the moving state of the user is the stop state, the GPS processor 32 preferably turns off the operation when the current position may be once detected and keeps the off-operation until the moving state is changed. Moreover, when the moving state of the user is the walking state, the GPS processor 32 preferably performs intermittent control for tuning itself on or off each time a predetermined time passes or each time a predetermined number of steps is calculated after the current position is detected. According to the configuration, the mobile phone 1 can reduce power consumption due to the GPS processor 32.

For the fourth embodiment, some points different from the first embodiment will be mainly explained below, and for configuration similar to that of the first embodiment, detailed explanation will be omitted.

When Getting on Train

Referring to FIG. 2, the user walks to the outside of the station in the time zone T01, passes through the ticket gate of the station in the time zone T02, and waits for a train at the platform of the station in the time zone T03. During this time, the GPS processor 32 performs matching with the map information to determine the current position, and thereby determines that the current position is the station.

The processing for determining whether the user is in the moving state by train or not, after it is determined that the current position is the station, is the same processing in the first embodiment, and therefore explanation thereof is omitted.

Moreover, the controller 41 can specify the station.

During the moving state by vehicle, the mobile phone 1 may determine the own current position by setting a time interval so as to be an interval of a predetermined moving distance based on, for example, an average speed of the vehicle and performing the intermittent control for tuning the GPS processor 32 on or off.

When the first determination module 42 determines that the change within the predetermined condition has occurred in the magnitude of the magnetism detected by the geomagnetic sensor 22, it is preferable that the controller 41 operates the GPS processor 32 and determines the current position. By doing this, the mobile phone 1 may determine the getting-on station, the way station, and the getting-off station where the change within the predetermined condition occurs in the magnitude of the magnetism, thus more accurately determine the getting-on station, the way station, the getting-off station, and the route. The mobile phone 1 may further reduce the power consumption due to the GPS processor 32.

When Getting Off Train

Since the user is in a walking state after getting off the train, the mobile phone 1 may determine the current position each time a predetermined time passes or each time a predetermined number of steps is calculated by the GPS processor 32.

By doing this, the mobile phone 1 may assume whether the user has exited to the outside of the station or is moving through the station for transfer.

As explained above, the mobile phone 1 may not only record time zones of the moving state by train from getting on the train to getting off the train and the cumulative time as the one day's lifelog of the user as history information, but also record a time period of the moving state by train by specifying the route, the getting-on station, the way station, the getting-off station, the transfer of trains, and the like.

The task setting module 45 is configured so as to set a task in association with passing of a predetermined way station in the moving state by train, and the mobile phone 1 is thereby capable of delivering, for example, the information that the user has passed the way station to the predetermined person by mail or the like.

Fifth Embodiment

In the mobile phone 1 according to one embodiment, the determination whether the moving state may be the moving state by train or not is easily made by the short-distance communication processor 33 and the first determination module 42.

For a fifth embodiment, some points different from the first embodiment will be mainly explained below, and detailed explanation of configuration similar to that of the first embodiment will be omitted.

Figure 8:
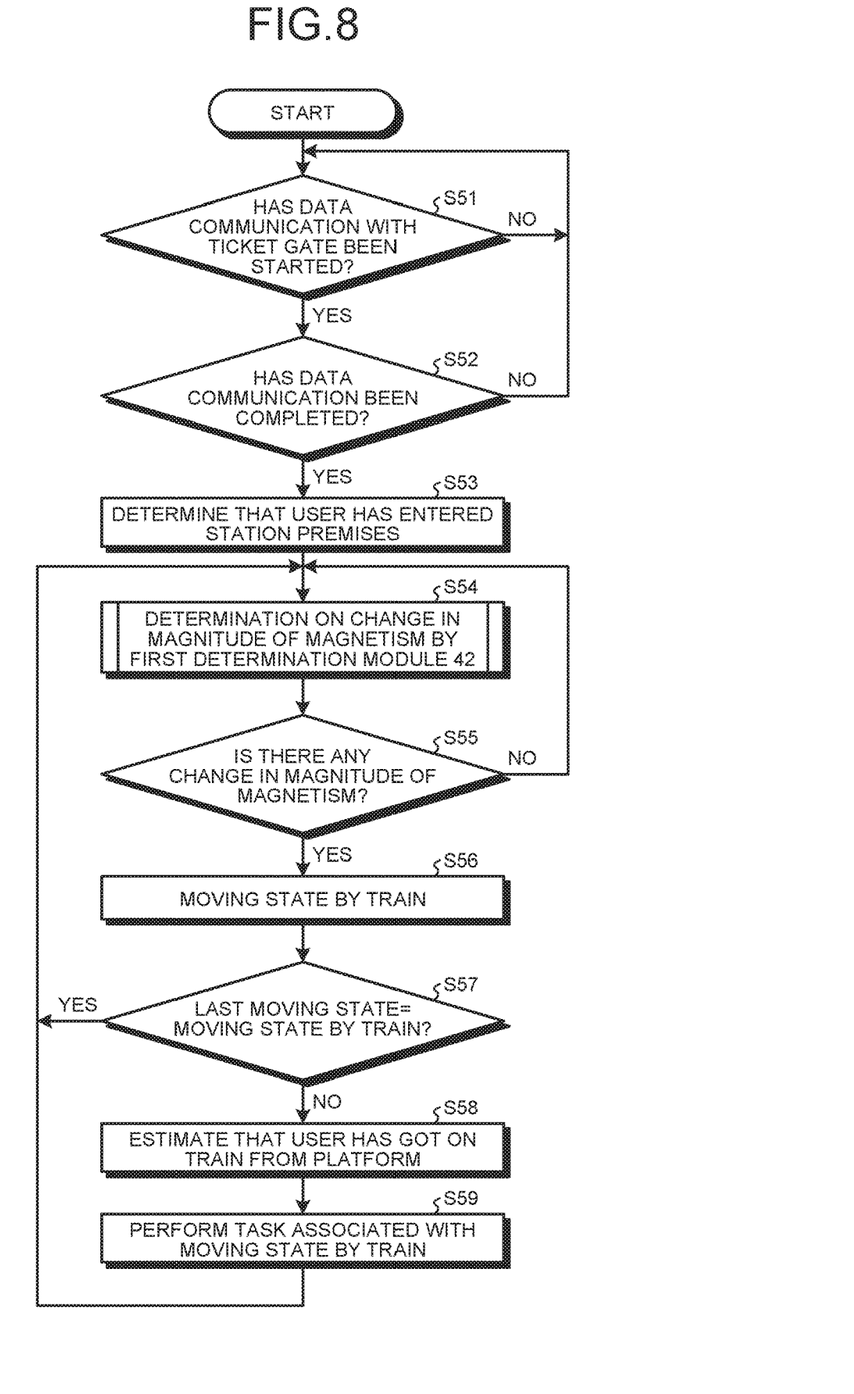
FIG. 8 is one of flowcharts for explaining a flow of operations for detecting the moving state by train by a mobile phone according to a fifth embodiment.

FIG. 8 is one of flowcharts for explaining a flow of processing for detecting the moving state by train by the mobile phone 1 according to the fifth embodiment.

At Step S51, the controller 41 determines whether the short-distance communication processor 33 has performed data communication with an external device of an automatic ticket gate at a station ticket gate. When the data communication has been performed between the short-distance communication processor 33 and the external device (Yes), the controller 41 proceeds to Step S52.

At Step S52, the controller 41 determines whether the short-distance communication processor 33 has completed the data communication, with the external device of the automatic ticket gate at the station ticket gate, for storing the name of the station and the time of the entrance of the user into the station premises by passing through the ticket gate. When the data communication has been completed (Yes), the controller 41 proceeds to Step S53.

At Step S53, the controller 41 determines that the user has entered the station premises. Therefore, the controller 41 can predict that the user is about to get on a train and move based on the state that the user has entered the station premises, detected by the short-distance communication processor 33.

At Step S54, the first determination module 42 determines the change in the magnitude of the magnetism detected by the geomagnetic sensor 22.

At Step S55, when it is determined that the change in the magnitude of the magnetism is a change within the predetermined condition (Yes), the controller 41 proceeds to Step S56. Meanwhile, when it is determined that the change in the magnitude of the magnetism is not a change within the predetermined condition (No), the controller 41 returns to Step S54.

At Step S56, the controller 41 determines that the moving state is the moving state by train in which the user is moving by train.

In this way, in the fifth embodiment, it may be easily determined that the user is in the moving state by train.

When Getting on Train and on the Train

Subsequently, at Step S57, the controller 41 determines whether the last type of the moving state immediately before the determination is the moving state by train or not. When the type of the last moving state is not the moving state by train (No), the controller 41 proceeds to Step S58, and estimates that the user has got on the train from the platform at Step S58. Meanwhile, when the type of the last moving state is the moving state by train (Yes), the controller 41 estimates that the moving state by train is continued, and returns to Step S54.

At Step S59, the controller 41 performs the task associated with the moving state by train by the task setting module 45. For example, when the task 01, the task 02, the task 03, and the task 04 are set, the controller 41 sets the mobile phone 1 to Silent mode, sets so as to automatically notify, when receiving an incoming call, the caller that the user is on the train, sets the mobile phone 1 to Manner talk, and delivers the information that the user has got on the train to a predetermined person by mail or the like. Thereafter, the controller 41 returns to Step S54.

When Getting Off Train

When the short-distance communication processor 33 may complete the data communication, with the external device of the automatic ticket gate at the station ticket gate, in order to store the name of the station and the time of the passage of the user through the ticket gate to exit the station premises and to perform fare processing, or the like, the controller 41 may determine that the user has gone out of the station premises. The controller 41 may determine the state that the user has exited the station premises as the state that the user has got off the train. The controller 41 then may correct the time point immediately before the determination that the change in the magnitude of the magnetism is the change within the predetermined condition, as the time of getting-off the train.

In this way, the mobile phone 1 can easily determine that the user has got off the train by detecting the state that the user has exited the station premises.

The exemplary embodiments have been explained so far; however, the present invention can be implemented in various forms without being limited to the embodiments. The effects described in the embodiments are only examples in which the most preferred effects derived from the present invention are described. Therefore, the advantageous effects of the present invention are not limited to the foregoing.

In the embodiments, the mobile phone 1 has been explained as the electronic device; however, the electronic device is not limited thereto. Therefore, the present invention is also applicable to various devices such as communication exclusive modules dedicated to communication functions, in addition to smartphones, PHS (registered trademark: Personal Handy phone System), PDA (Personal Digital Assistant), game devices, navigation devices, personal computers, and the like.

The embodiments have explained the configurations and the operations of the mobile phone 1 for determining the type of the moving state based on the acceleration detected by the acceleration sensor 21 and the change in the magnitude of the magnetism detected by the geomagnetic sensor 22 as well as the configurations and the operations of the mobile phone 1 for determining the type of the moving state based on the detection as to whether communication with the external device is performed or not by the short-distance communication processor 33 and the change in the magnitude of the magnetism detected by the geomagnetic sensor 22; however, the embodiments are not limited thereto. A function module of the electronic device may be configured as a program for causing a computer to implement.

The operations may be implemented by recording the program for implementing the functions of the electronic device in a computer-readable non-transitory recording medium, reading the program recorded in the recording medium into a computer system, and executing the program.

"Computer system" mentioned here includes an OS and hardware such as peripheral devices. "Computer-readable non-transitory recording medium" mentioned here indicates a portable medium such as a flexible disk, a magneto-optical disk, a ROM, an optical disk (CD, DVD, and Blu-ray (registered trademark), etc.), a memory card, and a USB disk; and a storage device such as a hard disk drive and a solid state drive built into the computer system.

The program for implementing the functions of the electronic device 1 may be stored in a computer-readable recording medium. "Computer-readable recording medium" mentioned here may include those that dynamically store a program for a short period of time like a communication wire used when the program is transmitted through a network such as the Internet and a communication line such as a telephone line and those that store a program for a given period of time like a volatile memory inside the computer system that functions as a server and a client in that case. The program may be those for implementing part of the functions and those that may further implement the functions in combination with the program already recorded in the computer system.

The invention claimed is:

1. An electronic device, comprising:
an acceleration sensor configured to detect acceleration;
a magnetic sensor configured to detect magnetism;
a controller configured to determine a type of a moving state of a user of the electronic device, based on the acceleration detected by the acceleration sensor and the magnetism detected by the magnetic sensor; and
a communication unit configured to perform communication with an external device, wherein
the controller is configured to,
in response to,
a determination (i), based on the acceleration detected by the acceleration sensor, that the moving state of the user is not a moving state by vehicle, and
a determination (ii) that a last determined moving state of the user, which was determined based on the magnetism detected by the magnetic sensor before the determination (i), was a moving state by train,
make a determination (iii), after the determination (ii) and based on a number of steps the user has walked, whether
the user has got off a train, or
the moving state of the user is the moving state by train,
the controller is configured to determine that the type of the moving state is the moving state by train further based on a result of detection as to whether the communication unit performs communication with the external device,
the electronic device is a mobile phone,
the external device is an automatic ticket gate at a train station, and
the communication unit is configured to communicate with the automatic ticket gate by non-contact IC communication.

2. The electronic device according to claim 1, wherein
the controller is configured to determine that the type of the moving state is the moving state by train in response to determining that
a change in the magnetism detected by the magnetic sensor is a change within a predetermined condition, and
a pattern of the acceleration detected by the acceleration sensor is a predetermined pattern.

3. The electronic device according to claim 2, wherein
the change within the predetermined condition is a state in which a first change in a magnetic flux density within n second/seconds is occurred and, thereafter, a second change in the magnetic flux density is maintained for m second/seconds.

4. The electronic device according to claim 1, further comprising:
a microphone, wherein
the controller is configured to determine the type of the moving state further based on sound data collected by the microphone.

5. The electronic device according to claim 1, wherein the controller is configured to set a predetermined task in association with each type of predetermined moving states and execute the predetermined task depending on the determined type of the moving state.

6. The electronic device according to claim 1, wherein the moving state includes a stop state and the moving state by train.

7. An electronic device, comprising:
a communication unit configured to perform communication with an external device;
a magnetic sensor configured to detect magnetism;
an acceleration sensor configured to detect acceleration; and
a controller configured to determine a type of a moving state of a user of the electronic device, based on a detection as to whether the communication unit performs communication with the external device and the magnetism detected by the magnetic sensor,
wherein
the controller is configured to,
in response to,
a determination (i), based on a result of the detection that the communication unit has completed communication with the external device, that the user has entered a train station, and
a determination (ii) that a last determined moving state of the user, which was determined based on the magnetism detected by the magnetic sensor, was not a moving state by train,
make a determination (iii), after the determination (ii) that the user has got on a train,
the electronic device is a mobile phone,
the external device is an automatic ticket gate at a train station,
the communication unit is configured to communicate with the automatic ticket gate by non-contact IC communication, and
the controller is configured to deliver information that the user has got on the train to the predetermined person by mail when the acceleration sensor detects that the user has walked a predetermined number of steps or more.

8. The electronic device according to claim 7, wherein the controller is configured to detect that the type of the moving state is the moving state by train in response to determining that
the communication unit has completed communication with the external device, and
a change in the magnetism detected by the magnetic sensor is a change within a predetermined condition.

9. The electronic device according to claim 7, wherein the controller is configured to set a predetermined task in association with each type of predetermined moving states and execute the predetermined task depending on the determined type of the moving state.

10. A determination method in an electronic device including an acceleration sensor, a magnetic sensor, a communication unit, and a controller, the determination method comprising:
detecting acceleration using the acceleration sensor;
detecting magnetism using the magnetic sensor; and
determining a type of a moving state of a user of the electronic device, based on the acceleration detected by the acceleration sensor and the magnetism detected by the magnetic sensor,
wherein
said determining comprises,
in response to,
a determination (i), based on the acceleration detected by the acceleration sensor, that the moving state of the user is not a moving state by vehicle, and
a determination (ii) that a last determined moving state of the user, which was determined based on the magnetism detected by the magnetic sensor before the determination (i), was a moving state by train,
making a determination (iii), after the determination (ii) and based on a number of steps the user has walked, whether
the user has got off a train, or
the moving state of the user is the moving state by train,
the type of the moving state of the user of the electronic device is determined further based on a result of detection as to whether the communication unit performs communication with an external device,
the electronic device is a mobile phone,
the external device is an automatic ticket gate at a train station, and
the communication unit communicates with the automatic ticket gate by non-contact IC communication.

11. The electronic device according to claim 1, wherein the controller is configured to, at the determination (iii), determine that the user has got off the train in response to the number of steps the user has walked being a predetermined number of steps or more.

12. The electronic device according to claim 1, wherein the controller is configured to estimate that the user has got on a train, in response to determinations that
the moving state of the user is the moving state by train, and
the last determined moving state of the user was not the moving state by train.

13. The electronic device according to claim 12, wherein the controller is configured to
execute one or more tasks associated with the moving state by train, upon an estimation that the user has got on the train, and
release the tasks associated with the moving state by train and execute tasks associated with getting off the train, when the user gets off the train.

14. The electronic device according to claim 13, wherein the controller is configured to
set at least one of following tasks (a)-(d) as the tasks associated with the moving state by train:
(i) setting the electronic device to silent mode,
(ii) upon receiving an incoming call from a caller, automatically notifying the caller that the user is on the train,
(iii) setting the electronic device to manner talk, and
(iv) delivering information that the user has got on the train to a predetermined person by mail, and
deliver information that the user has got off the train to the predetermined person by mail as one of the tasks associated with getting off the train.

* * * * *